March 7, 1933.  T. J. BRUCE  1,900,755
PISTON RING MILLING MACHINE
Filed Feb. 2, 1931  3 Sheets-Sheet 1

INVENTOR.
Thomas J. Bruce
BY William C. Edwards
and M. J. Charles —ATTORNEYS

March 7, 1933.　　　T. J. BRUCE　　　1,900,755
PISTON RING MILLING MACHINE
Filed Feb. 2, 1931　　　3 Sheets-Sheet 2
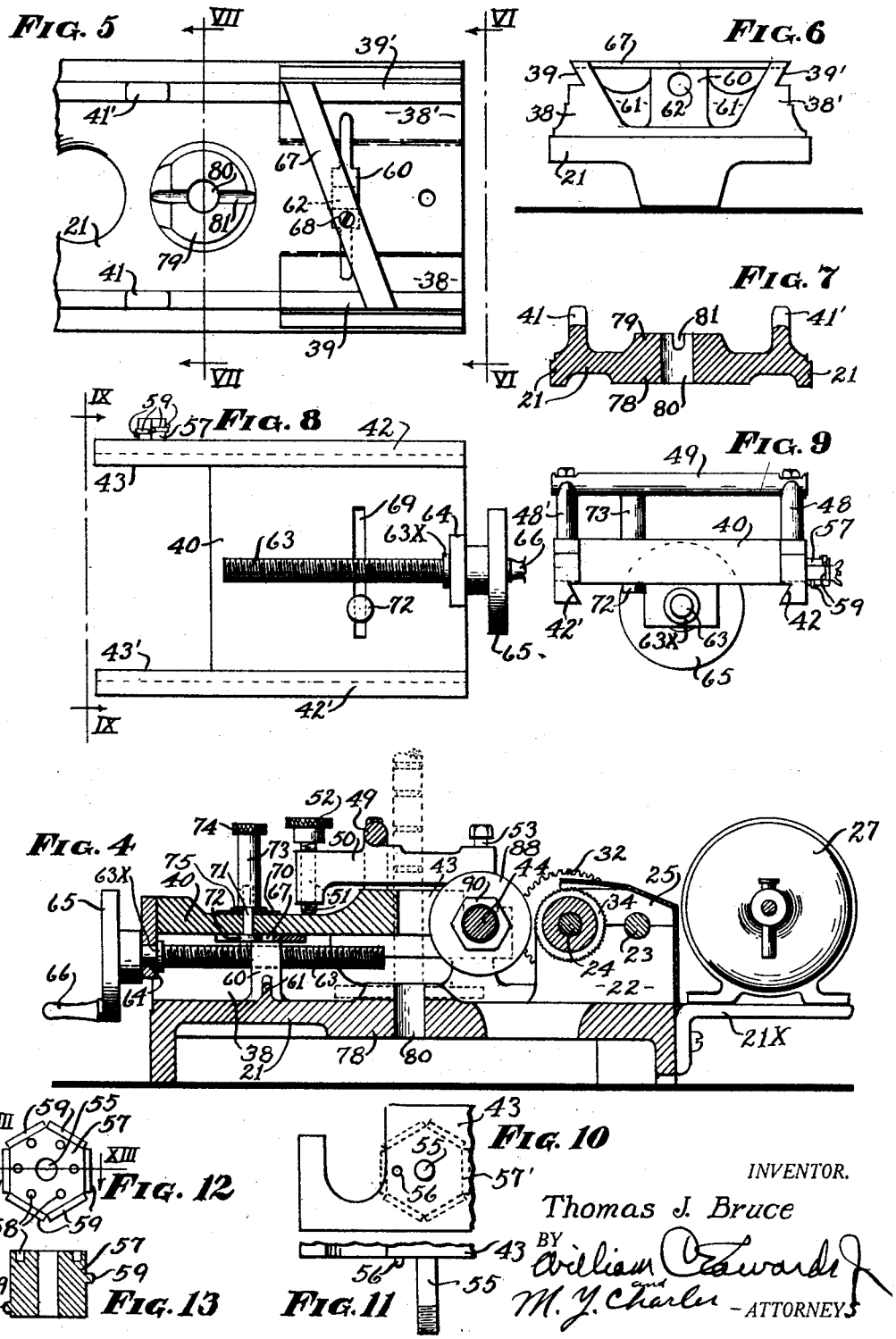

March 7, 1933.   T. J. BRUCE   1,900,755
PISTON RING MILLING MACHINE
Filed Feb. 2, 1931   3 Sheets-Sheet 3

INVENTOR.
Thomas J. Bruce
BY
William Edwards
M. J. Charles ATTORNEYS

Patented Mar. 7, 1933

1,900,755

UNITED STATES PATENT OFFICE

THOMAS J. BRUCE, OF WICHITA, KANSAS

PISTON RING MILLING MACHINE

Application filed February 2, 1931. Serial No. 512,858.

The invention relates to a portable machine useful for cutting grooves or slots in piston rings. One object of the invention is to provide a portable machine having a series of groups of circular cutters arranged on a power driven shaft and for the purpose of cutting grooves or slots in one or more piston rings at one time. Another object is to provide such a machine in which piston rings of different widths may be held before the selected group of cutting elements. Another object is to provide means for adjusting the depth of the cut made in the rings. Another object is to provide a machine that will hold piston rings of different diameters and having means for adjusting the depth of the cut, taking into consideration the diameter of the ring. Another object is to provide a machine having a series of groups of cutters, with the cutters of each group spaced apart to properly center the grooves or slots in each ring, or otherwise as may be predetermined, for instance with paired slots properly centered on each ring. Another object is to provide a machine having means for spacing a plurality of cuts as made in a ring, where the cut goes entirely through the ring to form a slot. These and other objects of the invention will be developed during the description of the drawings.

Figure 1:
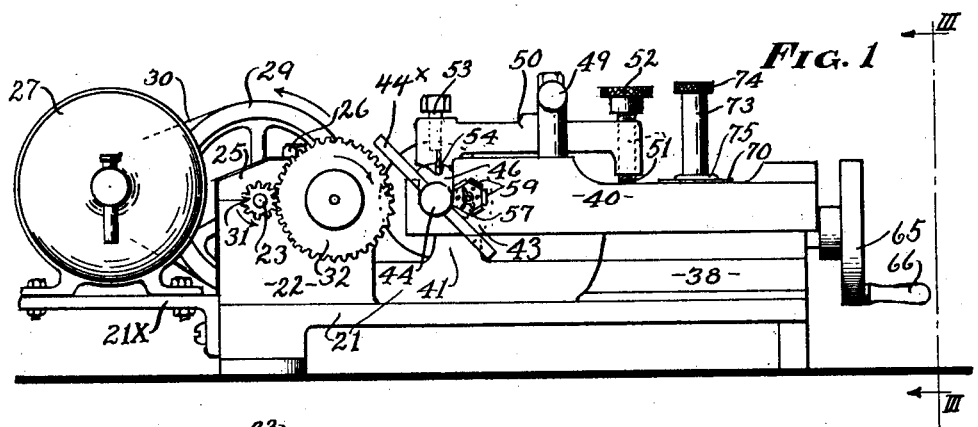
Figure 2:
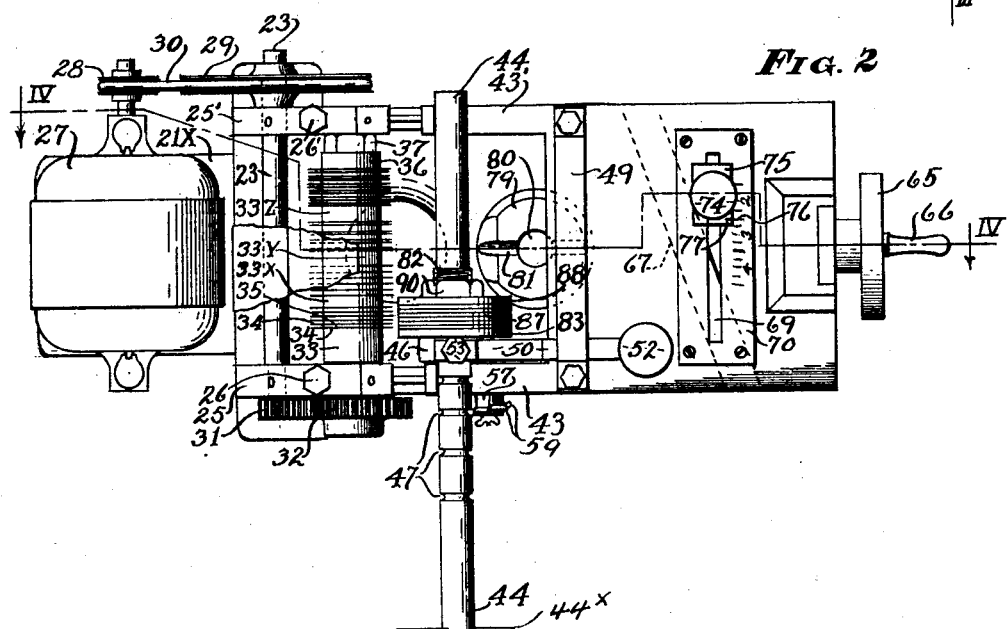
Figure 3:
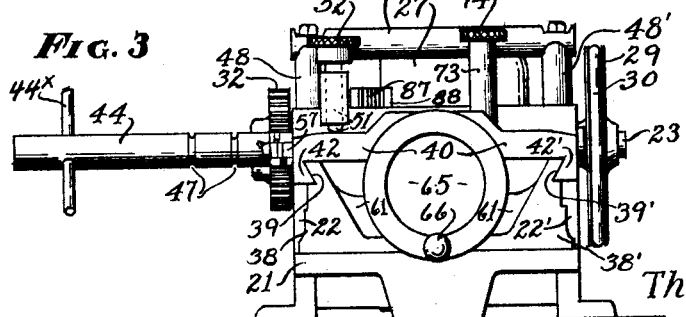
Figure 14:
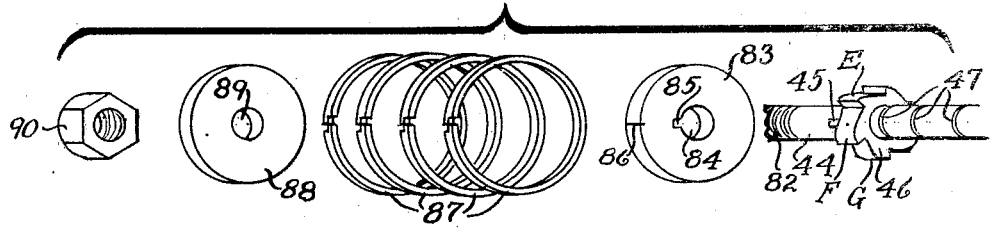
Figure 15:
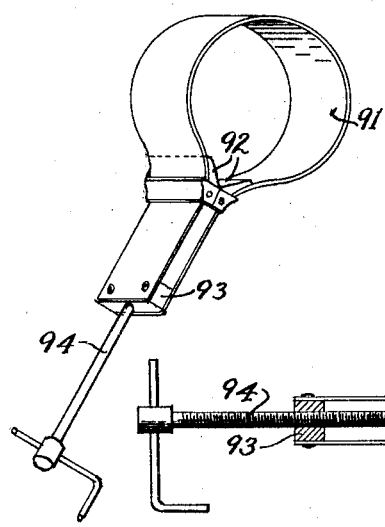
Figures 17, 18:
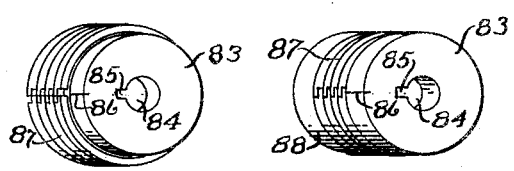
Figure 16:
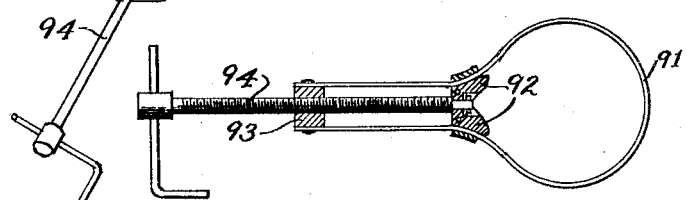
Figure 20:
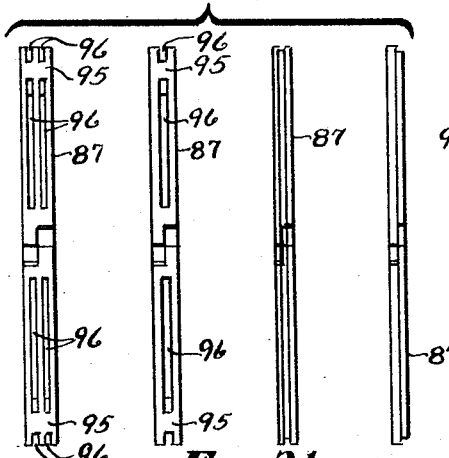
Figure 19:
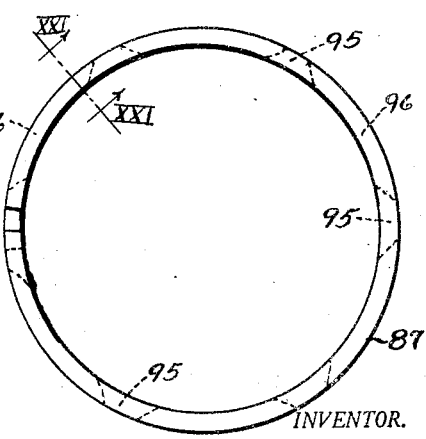
Figure 21:
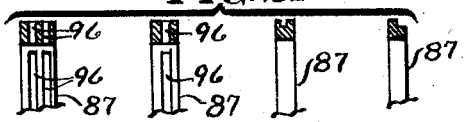

In the drawings, Fig. 1 represents a side view of my machine. Fig. 2 shows a plan view of Fig. 1. Fig. 3 represents a rear view as seen from the line III—III in Fig. 1. Fig. 4 is a sectional view as taken along the line IV—IV in Fig. 2. Fig. 5 represents a plan view of part of the base portion of the machine. Fig. 6 is a rear view of Fig. 5 as seen from the line VI—VI in Fig. 5. Fig. 7 is a sectional view as taken along the line VII—VII in Fig. 5. Fig. 8 is a plan view of the underside of the traveling bed. Fig. 9 is a front view of Fig. 8. Fig. 10 is a side view of the front end of the traveling bed. Fig. 11 is a plan view of Fig. 10. Fig. 12 is a side view of the shifting nut used on the bed. Fig. 13 is a sectional view taken along the line XIII—XIII in Fig. 12. Fig. 14 represents a disassociated arrangement of the parts of the machine and piston rings, prior to their assembly in the order disclosed for the purpose of cutting slots or grooves in the rings. Fig. 15 shows a perspective view of the clamp I employ in assembling the parts seen in Fig. 14. Fig. 16 represents a longitudinal sectional view through the clamp seen in Fig. 15. Fig. 17 represents a view of the piston rings as they are positioned between clamp blocks and before the rings are contracted by the clamp, Fig. 15, preparatory to being cut. Fig. 18 shows the assemblage seen in Fig. 17 after the rings have been contracted and in the position they will be when presented against the cutters. Fig. 19 shows a side view of a piston ring after it has been cut. Fig. 20 shows a grouping of four rings to represent varied types of grooves or slots as can be made with my improved machine. Fig. 21 shows sectional views through the several rings seen in Fig. 20, or as taken along the line XXI—XXI Fig. 19 for each said type of ring. Similar numerals of reference indicate corresponding parts throughout all the figures of the drawings.

Referring to the drawings; at 21 is disclosed the base element of my machine. Portions 22 and 22' upwardly project from the base 21, the upper ends of which constitute bearings for the parallel shafts 23 and 24, Fig. 4. Cap blocks 25 and 25' are held in place upon these portions 22 and 22' by means of the bolts 26 and 26'. At 21x Fig. 4 is shown a bracket rigid to the base 21 as a support for the electric motor 27. This motor has a drive pulley 28 driving a belt wheel 29 rigid to the shaft 23 by means of a belt 30. On the shaft 23 is a pinion 31 enmesh with the gear 32 rigid to the shaft 24, or so that the motor 27 drives the shaft 24. Integral with the shaft 24 or rigidly attached thereto is a cylindrical member 33. Sleeved on the shaft 24 and bearing against the member 33 is a circular cutter or saw 34 and on the opposite side of the saw 34 I sleeve on the shaft a washer 35 then another saw 34, then another washer 35 and so on alternately until the desired group of saw 34 members have been assembled on the shaft 24 at the spaced intervals determined by the use of washers 35 of the proper thickness. Assuming the thickness of the piston rings was $\frac{3}{16}$ inch, then I would make the washers 35 of the proper thickness to set the saws 34 $\frac{3}{16}$ inches apart on centers, or so that should a series of pistons rings, Fig. 18 be presented against their respective saws 34, each ring would be cut exactly in the same place during motor rotation. It is obvious that the same number of saws 34 would be used as would correspond to the desired number of rings to be cut at a single operation. Following the first set of saws 34 I place a spacing collar 33x upon the shaft 24. Against this collar I place alternately saws and washers in sequence as a second group of cutters such for instance as would properly space cuts in piston rings $\frac{1}{4}$ inch in thickness. Following the second series of cutters I follow with another collar 33y and then follow alternately with a group of cutters arranged in pairs each pair being separated by spacing washers. The cutters of each pair are also spaced at equal distances apart. Next I sleeve on shaft 24 another spacing collar 33z which is followed by a fourth group of paired cutters at spaced intervals different from those of the third group and to accommodate rings of a different thickness to that which would be cut by the third group. By means of the paired spacings, I am able to cut two slots or grooves in a single ring. At 36 is another spacer mounted on the shaft 24 and against which a jamb nut 37 threaded upon the shaft 24 bears to bind all the washers, collars and saws tightly on the shaft 24 or so that they will rotate as a unit.

The base member 21 extends rearwardly and is provided with upwardly projecting portions 38 and 38′ Fig. 3 having upper portions beveled as at 39 and 39′ as a track for a sliding bed 40. This bed 40 also rests upon upwardly projecting portions 41 and 41′ Fig. 7 integral with the base 21. The bed member 40 is provided with side edge beveled track members 42 and 42′ which are arranged to fit and slide on the track members 39 and 39′. At the front end of the bed 40 Fig. 9 are seen the forwardly extending portions 43 and 43′ having transverse depressions formed therein as seen in Fig. 1 and within which is revolvably arranged a shaft 44, Fig. 14 and having a key 45 and a ratchet member 46. The outer end of the shaft 44 is provided with grooves 47, the objects of this assembly being later explained.

On the bed 40 are a pair of upwardly projecting members 48 and 48′ to which a cross member 49 Fig. 3 is affixed. At 50 Fig. 1 is seen a clamp member, the center portion of which rests under the cross bar 49. At the rear end of the member 50 is seen a screw 51 having a knurled head 52 for adjusting the screw 51 from or towards the bed 40. The shaft 44 carrying the ratchet member 46 being in its seat in the members 43 and 43′, the rear end of the member 50 throws a downward pressure against the ratchet teeth 46 as a means of retaining the shaft 44 in place and also to prevent chattering and the like during the operation. For this purpose I provided the forward end of the member 50 with a hole in which is slidably mounted a stud 53, the lower end of which is provided with a stop 54 adapted to engage in the ratchet teeth 46.

On the member 43 is an outwardly projecting stud 55 and an outwardly projecting pin 56. At 57 is a hexahedral member having a central hole passing the stud 55 Fig. 10 or so that the member 57 may be rotated on the stud 55 as indicated by the dotted position 57′ Fig. 10. In the end of the member 57 are seen a plurality of holes 58, each adapted to receive the pin 56 and prevent the member 57 from rotating from a desired position. On the sides of the member 57 are rib like portions 59, each of said ribs 59 being stepped slightly in advance of preceding ribs for purposes later explained.

At 60 Fig. 6 is shown a member extending upwardly from the bed 21 and positioned between the members 38 and 38′ and joined therewith by means of a web member 61, which functions as a brace to give rigidity to the parts. In the upper end of the member 60 is a hole 62 threaded to receive a threaded shaft 63 which rotates in a bearing 64 carried by the bed 40. At 63x is a collar integral with the shaft 63 and on the oposite side is a hand wheel 65 and handle 66 and by which means the bed 40 may be slid back or forward on the track members 39 and 39′.

At 67 Fig. 5 is a flat member, the ends of which are countersunk in the track members 39 and 39′ so that the upper surface of the member 67 is flush with the upper surface of the track members 39 and 39′. The member 67 is set diagonally to the longitudinal axis of the machine and is held in position by means of a screw 68 passing through the member 67 and being threaded into the member 60. At 69 Fig. 8 is a slot cut through the bed 40 and a plate 70 rigidly attached to the bed 40 also has this slot 69. At 71 is a bolt having a head 72, this bolt passes through the slot 69 and screws into the base of the standard 73 which has a knurled head 74 with which to turn the standard 73. At 75 is member which is adapted to slide between the standard 73 and the plate 70. The head 72 contacts the edge of the member 67 as a stop to limit the forward movement of the bed 40. By loosening the standard 73 on the bolt 71, the bolt 71 and standard 73 may be moved along the slot 69 as an adjustment governing the distance the bed may be moved forwardly.

On the plate 70 are readings 76 and on the slide 75 is a mark 77 which is thus adjustably registered with preferred readings 76 for purposes later explained.

In Figs. 2, 5 and 7 the base is thickened at 78 and has a boss 79 provided with a vertical hole 80 in the longitudinal axis and intersected by a top groove 81.

Referring to Fig. 14, the space between the ratchet teeth E and F is greater than the space between the teeth F and G and all the teeth following the tooth F up to the tooth E are equally spaced. Half way between the space E and F on the shaft 44 will be seen the key 45 for purposes later explained. The shaft 44 is threaded as at 82. At 83 is shown a clamp block having a hole 84 and a keyway 85. The block 83 is slipped along the shaft 44 to rest against the ratchet member 46 with the key 45 engaging the keyway 85. The cut or mark 86 on the block 83 is arranged so as to stand half way between the ratchet teeth E and F. At 87 is shown a plurality of piston rings, with the ends of the rings aligning with the cut 86 Fig. 18. At 88 is a second clamp block having a hole 89 to receive the shaft 44. At 90 is seen a nut adapted to screw on the threads 82 and clamp the assemblage together.

In Figs. 15 and 16 is shown a clamp apparatus useful in contracting the rings Fig. 17 to the position seen in Fig. 18. This apparatus consists of a wide flexible band 91, preferably spring steel, the ends of said band being passed through a slip block 92 and rigidly fastened to a pull block 93. At 94 is a shaft threaded in the block 93 and revolvably terminating in the block 92 so that when the shaft 94 is turned, the block 92 is pushed forward thereby decreasing the diameter formed by the member 91. Now by placing the rings one on top of each other and with the step cuts in alignment with the cut 86 Fig. 17, the rings may be inserted in the enclosure of the member 91 and by screwing the shaft 94 to push the block 92 forward, the diameter of the circle 91 is decreased thereby causing the elements to conform to the view Fig 18. Thus the step cuts are closed and in alignment with the cut 86. This assembly is now sleeved upon the shaft 44 or so that the block 83 rests against the ratchet member 46. The nut 90 is next tightened and the assembly is completed, then the clamp 91 is removed. Next the assembly is placed in the machine preparatory to cutting the rings as follows: the shaft 44 is placed in the hook ends of the members 43 and 43' with one of the ribs 59 resting in a proper groove 47 of the shaft 44 so as to align the rings with the proper set of saws 34 to accomplish the desired cut. Should it be desired to shift the rod 44 so that the cutters will strip the edge of a ring instead of a central groove, the hexahedral member 57 would be turned so that a different rib 59 would enter the groove 47 thereby effecting the required shifting movement of the shaft 44 to arrange the rings in the desired position before the cutters 34.

Now assuming the rings are 2½ inches in diameter, the slide 75 is moved so that the mark 77 registers with the 2½ inch mark on the vernier 76, after which the wheel 65 may be turned so that the shaft 63 will pull the bed back towards the cutters 34 and the rings 87 will be engaged thereby. This forward travel of the bed 40 may be then continued until the head 72 strikes the bar 67 which then limits the forward movement of the rings and serves as a gauge for the depth of the cut as made in the rings by the saws.

To cut the slots in the rings as shown in Figs. 20 and 21, a solid partition 95 Fig. 19 occurs between the slots 96. All of the partitions are of equal dimensions except between the step cuts, therefore more room must be allowed between the last two slots for the space taken up by the step cut. This is accomplished by the spacing of the ratchet teeth E and F and explains the reason for the care in aligning the step cuts with the cut 86 to center midway between said ratchet teeth.

The operation of cutting the grooves or slots is as follows. The cutter arbor driven by the motor 27 is rotating, so that as the bed 40 is moved forward the rings will be cut by the saws 34 to the predetermined depth. After the cut is made the shaft 44 is turned one space as measured by the ratchet teeth 46 and so on until the cycle has been completed, at which time the rings may be removed from the shaft 44, said rings having slots cut therein as indicated in the views disclosed in Fig. 20 depending upon the saws as employed. Should grooves be desired instead of slots, the cutters would be entered to the proper depth and the shaft 44 be turned by the handle 44x until the complete cut was made around the rings.

Having fully described my invention and reserving the right to employ modifications in keeping with the appended claims, I claim as new and desire to secure by Letters Patent:

1. In a piston ring milling machine, a base element, a motor supported from said base element, a drive shaft in bearings on the base element; said drive shaft being driven by said motor, an arbor shaft carrying cutters driven by the drive shaft; a bed slidably arranged for movements from or towards the arbor shaft, said bed having seats as bearings for a detachably associated cross shaft carrying a compacted set of piston rings; said cross shaft having a ratchet element and means on the bed plate for engaging said ratchet for the purpose of spacing cuts as slots in the piston rings when said rings are advanced against the rotating cutters under limited movement of the bed element, and means for controlling the forward and rearward movement of the bed plate.

2. In a piston ring milling machine, a base element, a motor supported from said base element, a drive shaft in bearings on said base element, said drive shaft being driven by said motor, an arbor shaft carrying cutters and being driven by said drive shaft, a bed slidably arranged for movement from or towards the arbor shaft, said bed having seats as bearings for a detachably associated cross shaft carrying a compacted set of piston rings; a diagonally fixed plate carried by the base element as a stop, a transverse slot in the slidable bed element, a vernier and an element slidably arranged in said slot having means for clamping said element in a desired position with respect to said vernier and provided with a head adapted to contact the diagonal plate as a stop to the forward travel of the slidable bed plate during its sliding movement upon the base element, and means of propulsion for said slidable bed plate.

3. In a piston ring milling machine, a base element, a motor supported from said base element, a drive shaft in bearings on the base element, said drive shaft being driven by said motor, an arbor shaft carrying cutters and driven by the drive shaft; a bed slidably arranged for movement from or towards the arbor shaft, said bed having seats as bearings for a detachably associated cross shaft carrying a compacted set of piston rings; said cross shaft having a plurality of circular grooves, said bed plate having a projecting stud, a hexahedral element rotatable upon said stud, said hexahedral element having a rib on each face at stepped relationship to each other and for selectively engaging a rib within a selected circular groove on the cross shaft for transverse adjustment of the rings with respect to the cutters on the arbor shaft; and means for controlling the sliding movement of the bed on the base element.

4. In a piston ring milling machine, a base element, a drive shaft in bearings on the base element; means for driving said drive shaft, an arbor shaft carrying cutters driven by the drive shaft, a bed slidably arranged for movements from or towards the arbor shaft, said bed having seats as bearings for a detachably associated cross shaft carrying a compacted set of piston rings; said cross shaft having a plurality of circular grooves and means on the bed to engage a selected circular groove on said cross shaft and shift the cross shaft transversely of the machine for fine adjustment of the piston rings before the cutters on the arbor shaft; and means between said base and bed elements for sliding the bed longitudinally on the base element.

5. In a piston ring milling machine, a base element, a motor supported from said base element, a drive shaft in bearings on the base element, said drive shaft being driven by the said motor; an arbor shaft carrying cutters, said arbor shaft being mounted in bearings on the base element and being driven by the said drive shaft; a bed slidably arranged on the base element for movements from or towards the arbor shaft, said slidable bed having seats as bearings for a detachably associated cross shaft carrying a compacted set of piston rings; said cross shaft having a plurality of circular grooves therein, means carried on said bed plate to engage any selected groove in said cross shaft for the purpose of aligning the piston rings on said cross shaft in a desired relationship to the cutters on the arbor shaft; means for controlling the forward and rearward movements of the slidable bed plate for the engagement of the cutters with the piston rings in a preferred relationship.

In testimony whereof I affix my signature.

THOMAS J. BRUCE.